United States Patent
Shimano et al.

(10) Patent No.: US 8,993,168 B2
(45) Date of Patent: Mar. 31, 2015

(54) POWDER AND LITHIUM NICKEL MIXED METAL OXIDE

(75) Inventors: Satoshi Shimano, Tsukuba (JP); Kensaku Horie, Tsukuba (JP); Toshinori Isobe, Tsuchiura (JP)

(73) Assignee: Sumitomo Chemical Company, Limited, Tokyo (JP)

(*) Notice: Subject to any disclaimer, the term of this patent is extended or adjusted under 35 U.S.C. 154(b) by 585 days.

(21) Appl. No.: 13/375,869

(22) PCT Filed: Jun. 3, 2010

(86) PCT No.: PCT/JP2010/059799
§ 371 (c)(1),
(2), (4) Date: Dec. 2, 2011

(87) PCT Pub. No.: WO2010/140707
PCT Pub. Date: Dec. 9, 2010

(65) Prior Publication Data
US 2012/0088145 A1 Apr. 12, 2012

(30) Foreign Application Priority Data
Jun. 4, 2009 (JP) ................................ 2009-134833

(51) Int. Cl.
| | | |
|---|---|---|
| H01M 4/00 | (2006.01) | |
| H01M 4/13 | (2010.01) | |
| H01M 4/58 | (2010.01) | |
| H01M 4/50 | (2010.01) | |
| H01M 4/88 | (2006.01) | |
| H01M 4/525 | (2010.01) | |
| H01M 2/16 | (2006.01) | |
| H01M 10/0525 | (2010.01) | |
| C01G 53/00 | (2006.01) | |

(52) U.S. Cl.
CPC ............ *H01M 4/525* (2013.01); *H01M 2/1653* (2013.01); *H01M 2/1686* (2013.01); *H01M 10/0525* (2013.01); *C01G 53/42* (2013.01); *Y02E 60/122* (2013.01); *C01P 2006/10* (2013.01); *C01P 2006/12* (2013.01); *C01P 2006/40* (2013.01)
USPC ........ 429/223; 429/218.1; 429/221; 429/224; 429/231.95; 252/182.1

(58) Field of Classification Search
USPC ................. 429/223, 221, 224, 218.1, 231.95; 252/182.1
See application file for complete search history.

(56) References Cited

U.S. PATENT DOCUMENTS

| | | | |
|---|---|---|---|
| 5,626,635 A | | 5/1997 | Yamaura et al. |
| 5,985,488 A | * | 11/1999 | Mitate et al. .................. 429/223 |
| 2011/0059363 A1 | | 3/2011 | Imanari et al. |

FOREIGN PATENT DOCUMENTS

| | | |
|---|---|---|
| EP | 1372202 A1 | 12/2003 |
| EP | 2174915 A1 | 4/2010 |
| JP | 8-222220 A | 8/1996 |
| JP | 2005-15282 A | 1/2005 |
| JP | 2006-147499 A | 6/2006 |
| JP | 2008-243447 A | 10/2008 |
| JP | 2009-32655 A | 2/2009 |
| WO | WO 02/073718 A1 | 9/2002 |

OTHER PUBLICATIONS

Notice of Reasons for Rejection mailed Oct. 1, 2013 in counterpart Japanese Patent Application No. 2009-134833 with English translation.
Computer-generated English translation of JP 2006-147499 A to Sumitomo Metal Mining Co., Ltd.
Computer-generated English translation of JP 2005-15282 A to Mitsubishi Chemicals Corporation.
International Search Report of PCT/JP2010/059799, dated Sep. 21, 2010.

* cited by examiner

*Primary Examiner* — Patrick Ryan
*Assistant Examiner* — Julian Anthony
(74) *Attorney, Agent, or Firm* — Sughrue Mion, PLLC

(57) ABSTRACT

Disclosed is a powder comprising a lithium-containing compound and a nickel-containing mixed metal compound, and satisfying the following requirements of (1) and (2) when the powder is analyzed by plasma emission spectrometry of particles:
(1) an absolute deviation of a synchronous distribution chart against an approximated straight-line is 0.10 or less, wherein the approximated straight-line is evaluated from a synchronous distribution chart obtained by plotting an emission intensity of lithium and an emission intensity of nickel of each particle composing of the powder, and
(2) a release rate of lithium evaluated by the following formula is 80 or less:

Release rate of lithium=$(n_b/n_a) \times 100$ wherein, $n_a$ is the number of particles containing lithium in the powder, and $n_b$ is the number of particles containing lithium and not containing nickel in the powder.

10 Claims, No Drawings

POWDER AND LITHIUM NICKEL MIXED METAL OXIDE

TECHNICAL FIELD

The present invention relates to a powder and a lithium nickel mixed metal oxide. More particularly, the present invention relates to a lithium nickel mixed metal oxide used as a positive electrode active material of a nonaqueous electrolyte secondary battery and a powder suitably used as a raw material of the lithium nickel mixed metal oxide.

BACKGROUND ART

A lithium nickel mixed metal oxide is used as a positive electrode active material of nonaqueous electrolyte secondary batteries such as lithium secondary batteries. Lithium secondary batteries are being used as compact power source for cell phones, notebook computers and the like, and it has been also attempted to further use lithium secondary batteries as a large-sized power source in automobile applications, power storage applications and the like.

As a positive electrode active material of nonaqueous electrolyte secondary batteries, a lithium nickel mixed metal oxide, which is obtained by calcining of powder obtained by mixing a mixed metal hydroxide which contains Ni and another transition metal element(s) such as Co and a lithium-containing compound, is often used. Examples of the method for the above-described mixing include wet methods in which mixing is carried out in a wet state and the solvent is then evaporated (for example, see WO 02/073718 A1) and dry methods in which mixing is carried out using a ball mill (for example, see JP 8-222220 A).

As described above, there are a variety of known mixing methods. However, it has not been determined yet what kind of mixed powder is suitable as a lithium nickel mixed metal oxide raw material. In addition, the discharge capacity of a nonaqueous electrolyte secondary battery in which a lithium nickel mixed metal oxide obtained by calcining of conventional powder is used as a positive electrode active material is still not sufficient.

DISCLOSURE OF THE INVENTION

An object of the present invention is to provide a lithium nickel mixed metal oxide suitable for a nonaqueous electrolyte secondary battery exhibiting high discharge capacity and a powder suitably used as a raw material of the lithium nickel mixed metal oxide.

The present invention provides the following means.

<1> A powder comprising a lithium-containing compound and a nickel-containing mixed metal compound, and satisfying the following requirements of (1) and (2) when the powder is analyzed by plasma emission spectrometry of particles:
(1) an absolute deviation of a synchronous distribution chart against an approximated straight-line is 0.10 or less, wherein the approximated straight-line is evaluated from a synchronous distribution chart obtained by plotting an emission intensity of lithium and an emission intensity of nickel of each particle composing of the powder, and
(2) a release rate of lithium evaluated by the following formula is 80 or less:

Release rate of lithium=$(n_b/n_a) \times 100$ wherein, $n_a$ is the number of particles containing lithium in the powder, and $n_b$ is the number of particles containing lithium and not containing nickel in the powder.

<2> The powder according to <1>, wherein the nickel-containing mixed metal compound further contains, in addition to nickel, at least one transition metal element selected from the group consisting of cobalt, manganese and iron, and the molar ratio of nickel with respect to all transition metal elements in the nickel-containing mixed metal compound is 0.3 or more and 0.9 or less.

<3> The powder according to <1> or <2>, wherein the molar ratio of lithium with respect to all transition metal elements in the nickel-containing mixed metal compound is 0.9 or more and 1.3 or less.

<4> The powder according to any one of <1> to <3>, wherein the lithium-containing compound is lithium hydroxide.

<5> The powder according to any one of <1> to <4>, wherein the nickel-containing mixed metal compound is a nickel-containing mixed metal hydroxide.

<6> A lithium nickel mixed metal oxide obtained by calcining the powder according to any one of <1> to <5> at a temperature in the range of 650° C. or more and 1050° C. or less.

<7> The lithium nickel mixed metal oxide according to <6>, which has a bulk density of from 2.0 to 3.5 g/cm$^3$.

<8> An electrode comprising the lithium nickel mixed metal oxide according to <6> or <7>.

<9> A nonaqueous electrolyte secondary battery comprising a positive electrode, a negative electrode and an electrolyte, wherein the positive electrode is the electrode according to <8>.

<10> The nonaqueous electrolyte secondary battery according to <9>, further comprising a separator.

<11> The nonaqueous electrolyte secondary battery according to <10>, wherein the separator is composed of a laminated film which has a porous film and a heat resistant porous layer laminated thereon.

MODE FOR CARRYING OUT THE INVENTION

<The Powder According to the Present Invention>
The powder according to the present invention comprises a lithium-containing compound and a nickel-containing mixed metal compound and satisfies the following requirements of (1) and (2) when the powder is analyzed by plasma emission spectrometry of particles:
(1) an absolute deviation of a synchronous distribution chart against an approximated straight-line is 0.10 or less, wherein the approximated straight-line is evaluated from a synchronous distribution chart obtained by plotting an emission intensity of lithium and an emission intensity of nickel of each particle composing of the powder, and
(2) a release rate of lithium evaluated by the following formula is 80 or less:

Release rate of lithium=$(n_b/n_a) \times 100$ wherein, $n_a$ is the number of particles containing lithium in the powder, and $n_b$ is the number of particles containing lithium and not containing nickel in the powder.

The plasma emission spectrometry of particles performed on the powder is an analytical method for judging the dispersion condition of the lithium element and transition metal element in each particle constituting the powder, and examples of an analyzer used therefor include a particle analyzer (manufactured by Horiba Ltd.: DP-1000 model). In this analytical method, a prescribed amount of the powder is directly fed into plasma and the particles constituting the powder are each subjected to emission spectrometry to identify the elements constituting each particle and measure the emission time thereof. For example, in cases where a particle contains two elements, the two elements emit light simultaneously; therefore, this analytical method can judge that the two elements are contained in one particle. Further, in cases where two elements are separately contained in different particles, the two elements emit light at different times, so that it can be judged that the two elements are separately contained in different particles.

With regard to the above-described requirement (1), each point in the synchronous distribution chart obtained by plotting the emission intensity of lithium and the emission intensity of nickel represents the amount of lithium element contained in a nickel-containing particle with respect to the nickel element content, and the absolute deviation of the above-described synchronous distribution chart with respect to an approximate straight-line determined in this synchronous distribution chart means the variation in the lithium element content with respect to the nickel element content in each nickel-containing particle. When the elements are completely uniformly mixed, theoretically, the above-described absolute deviation becomes zero. In the present invention, the absolute deviation prescribed in the requirement (1) is not greater than 0.10, preferably not greater than 0.08, more preferably not greater than 0.06. This absolute deviation is usually not smaller than 0.01, and from the standpoint of the ease of handling of the powder, it is preferably not smaller than 0.03. In this synchronous distribution chart, a particle containing nickel but not lithium is indicated on the axis representing emission intensity of nickel and a particle containing lithium but not nickel is indicated on the axis representing the emission intensity of lithium. The particle analyzer indicates the emission intensity of lithium and the emission intensity of nickel in units of cube root voltage, and they can be regarded as indices of the size of a particle constituting the powder.

With regard to the above-described requirement (2), the release rate of lithium is not higher than 80, preferably not higher than 70, more preferably not higher than 50. In addition, the release rate of lithium is usually not lower than 10, and from the standpoint of the ease of handling of the powder, it is preferably not lower than 20.

From the standpoint of further improving the capacity and output of the resulting nonaqueous electrolyte secondary battery, it is preferable that the nickel-containing mixed metal compound in the present invention further contain, in addition to nickel, at least one transition metal element selected from the group consisting of cobalt, manganese and iron, and it is more preferable that the nickel-containing mixed metal compound have a molar ratio of nickel with respect to all transition metal elements of 0.3 to 0.9. Further, it is preferable that the nickel-containing mixed metal compound have a molar ratio of lithium with respect to all transition metal elements of 0.9 to 1.3.

<Method of Producing Nickel-Containing Mixed Metal Compound>

The nickel-containing mixed metal compound in the present invention can be obtained by a method comprising the step of coprecipitating nickel and at least one element other than nickel. A nonaqueous electrolyte secondary battery which is ultimately obtained by using the nickel-containing mixed compound produced by this method has exceptionally good charge-discharge cycle characteristics. A specific example of this method is a production method comprising the following steps (1) and (2) in this order:

(1) the step of bringing an aqueous solution containing nickel and at least one element other than nickel into contact with a precipitating agent to obtain a coprecipitated slurry; and (2) the step of obtaining a coprecipitate from the thus obtained coprecipitated slurry.

In the above-described step (1), as the aqueous solution containing nickel and at least one element other than nickel (hereinafter, may be referred to as "aqueous transition metal solution"), for example, in cases where the element other than nickel is at least one transition metal element M selected from the group consisting of cobalt, manganese and iron, any aqueous solution containing Ni and M (M is one or more elements selected from the group consisting of Co, Mn and Fe) can be employed. As the respective transition metal element material, a compound such as chloride, nitrate, acetate, formate or oxalate thereof can be used. The aqueous transition metal solution can be obtained by dissolving such compound(s) in water. In cases where a transition metal element material which hardly dissolves in water, such as an oxide, hydroxide or metal material, is used as a raw material, the aqueous transition metal solution can be also obtained by dissolving such material(s) in an acid such as hydrochloric acid, sulfuric acid, nitric acid or in an aqueous solution thereof.

In the above-described step (1), as the precipitating agent, at least one compound selected from the group consisting of LiOH (lithium hydroxide), NaOH (sodium hydroxide), KOH (potassium hydroxide), $Li_2CO_3$ (lithium carbonate), $Na_2CO_3$ (sodium carbonate), $K_2CO_3$ (potassium carbonate), $(NH_4)_2CO_3$ (ammonium carbonate) and $(NH_2)_2CO$ (urea) can be employed. These compounds may be used in the form of a hydrate or in combination with a hydrate thereof. It is preferable that the precipitating agent be dissolved in water to be used in the form of an aqueous solution.

Examples of the method of bringing the aqueous transition metal solution into contact with the precipitating agent in the above-described step (1) include a method in which the precipitating agent (including one in the form of an aqueous solution) to the aqueous transition metal solution; a method in which the aqueous transition metal solution is added to the precipitating agent in the form of an aqueous solution; and a method in which the aqueous transition metal solution and precipitating agent (including one in the form of an aqueous solution) are added to water. It is preferable that these additions be performed by stirring. In the step (1), a coprecipitated slurry can be obtained by performing the above-described contact.

In the step (2), a coprecipitate can be obtained from the above-described coprecipitated slurry. The step (2) may be carried out by any method as long as a coprecipitate can be obtained; however, from the standpoint of operability, a method based on solid-liquid separation, such as filtration, is preferably employed. A coprecipitate can also be obtained by a method in which the coprecipitated slurry is heated to evaporate liquid, such as spray drying.

In the step (2), in cases where a coprecipitate is obtained by solid-liquid separation, it is preferable that the above-described step (2) be the following step (2'):

(2') the step of obtaining a coprecipitate by subjecting the coprecipitated slurry to solid-liquid separation and then washing and drying the resulting solid.

In the step (2'), in cases where the solid obtained by the solid-liquid separation contains excessive impurities such as an alkali and Cl, these can be removed by washing the solid. From the standpoint of efficiently washing the solid, it is preferable that water be used as the washing solution. However, it should be noted that a water-soluble organic solvent such as acetone may also be added to the washing solution as required. The washing may be carried out twice or more and, for example, the solid may be washed with water and then washed again with the above-described water-soluble organic solvent.

In the step (2'), after the washing, the resulting solid is dried to obtain a coprecipitate. The drying is usually carried out by heat treatment; however, it may also be carried out by blow drying, vacuum drying or the like. In cases where the drying is carried out by a heat treatment, the heat treatment temperature is usually around from 50 to 300° C., preferably around from 100 to 200° C.

The coprecipitate obtained in the above-described manner is a nickel-containing mixed metal compound. In cases where an alkaline metal or alkali such as ammonia is used as the precipitating agent, the nickel-containing mixed metal compound is a nickel-containing mixed metal hydroxide. A nickel-containing mixed metal hydroxide is a preferable nickel-containing mixed metal compound.

<Lithium-Containing Compound>

Examples of the lithium-containing compound include at least one anhydride and/or at least one hydrate selected from the group consisting of lithium hydroxide, lithium chloride, lithium nitrate and lithium carbonate. From the standpoint of further increasing the capacity of the resulting nonaqueous electrolyte secondary battery, lithium hydroxide is preferable.

<Method of Producing the Powder According to the Present Invention>

The powder according to the present invention can be obtained by mixing the above-described lithium-containing compound with the above-described nickel-containing mixed metal compound. When mixing these compounds, adjustment must be made in such a manner that the resulting powder satisfies the above-described requirements (1) and (2). For example, it is preferable to employ a stirring-type mixer which does not use a pulverizing medium or to carry out dry mixing. Examples of the mixer include stirring-type mixers such as Loedige mixer, V-type mixers, W-type mixers, ribbon mixers and drum mixers. When a mixer with a pulverizing medium is used, the pulverizing medium imposes large shearing stress to the lithium-containing compound and nickel-containing mixed metal compound, so that these compounds are pulverized and miniaturized. By this miniaturization, these compounds can easily free themselves from each other and consequently, the release rate of lithium tends to become high. For instance, in cases where a stirring-type mixer is employed, the longer the stirring time by a stirring blade, the smaller the standard deviation in the requirement (1) of the present invention and the release rate of lithium in the requirement (2) tend to become. Also, the higher the stirring rate, the smaller the standard deviation in the requirement (1) of the present invention and the release rate of lithium in the requirement (2) tend to become. In cases where a mixer which has a second stirring wing such as a chopper in addition to a stirring blade is employed, by using the stirring blade and wing in combination, the standard deviation in the requirement (1) of the present invention and the release rate of lithium in the requirement (2) tend to become smaller.

<Lithium Nickel Mixed Metal Oxide>

A lithium nickel mixed metal oxide is obtained by calcining the above-described powder. The retention temperature in the calcination influences the sizes of the primary and secondary particles of the resulting lithium nickel mixed metal oxide and its BET specific surface area. Usually, the higher the retention temperature, the larger the sizes of the primary and secondary particles tend to become and the smaller the BET specific surface area tend to become. The retention temperature in the calcination depends on the type of the transition metal element and the precipitating agent, and it is preferably 500° C. to 1150° C., more preferably 650° C. to 1050° C. The above-described retention temperature is maintained usually for 0.1 to 20 hours, preferably 0.5 to 10 hours. The heating rate to the above-described retention temperature is usually 50 to 400° C./hr, and the cooling rate from the above-described retention temperature to room temperature is usually 10 to 400° C./hr. Examples of calcination atmosphere include air, oxygen, nitrogen, argon and mixed gases thereof.

The above-described calcination may also be carried out in the presence of an inert flux. Examples of the inert flux include chlorides such as NaCl, KCl and $NH_4Cl$; fluorides such as NaF, KF and $HN_4F$; and boric acid. By calcining the powder according to the present invention in the presence of such inert flux, the reactivity of the powder may be improved and the sizes of the primary and secondary particles of the resulting lithium nickel mixed metal oxide and its BET specific surface area may be adjusted. It is also possible to use two or more inert fluxes. The inert flux(es) may remain in the lithium nickel mixed metal oxide after the calcination, or may be removed by, for example, washing the calcined lithium mixed metal oxide or allowing the inert flux(es) to be evaporated.

After the above-described calcination, the resulting lithium nickel mixed metal oxide may be pulverized using a ball mil, jet mill or the like. The pulverization and calcination may be repeated twice or more. The lithium nickel mixed metal oxide can also be washed or classified as required. In this manner, it is also possible to adjust the bulk density of the lithium nickel mixed metal oxide, and the bulk density is preferably 2.0 to 3.5 $g/cm^3$.

By using the lithium nickel mixed metal oxide obtained from the above-described powder of the present invention as positive electrode active material, a nonaqueous electrolyte secondary battery which exhibits extremely high discharge capacity per unit volume can be obtained.

Within the range not adversely affecting the effects of the present invention, a compound different from the lithium nickel mixed metal oxide according to the present invention may also be attached to the surface of the particles constituting the lithium nickel mixed metal oxide. Examples of such compound include compounds containing at least one element selected from the group consisting of B, Al, Ga, In, Si, Ge, Sn, Mg and transition metal elements, preferably compounds containing at least one element selected from the group consisting of B, Al, Mg, Ga, In and Sn, and more preferably Al compounds. More specific examples of the compound include oxides, hydroxides, oxyhydroxides, carbonates, nitrates and organic acid salts of the above-described elements, and preferably oxides, hydroxides and oxyhydroxides. These compounds may also be used in combination. Among these compounds, alumina is a particularly preferable compound. After the attachment, heating may also be performed.

<Method of Producing the Electrode According to the Present Invention>

The electrode according to the present invention comprises the above-described lithium nickel mixed metal oxide. Using the above-described lithium nickel mixed metal oxide, the electrode can be obtained in the following manner. The electrode is produced by allowing an electrode current collector to support an electrode mixture containing the lithium nickel mixed metal oxide, an electroconductive material and binder. As the above-described electroconductive material, a carbonaceous material can be employed, and examples thereof include graphite powders, carbon black, acetylene black and fibrous carbonaceous materials. Since carbon black and acetylene black are in the form of fine particles and have a large surface area, they can be added in a small amount to the electrode mixture to enhance the electroconductivity inside the electrode, thereby improving the charge and discharge efficiencies and rate properties of nonaqueous electrolyte secondary battery. However, when these are added in an excessive amount to the electrode mixture, the adhesion between the electrode mixture and electrode current collector may be impaired, resulting in an increase in the internal resistance. Usually, the amount of the electroconductive material in the electrode mixture is 5 parts by weight to 20 parts by weight with respect to 100 parts by weight of the lithium nickel mixed metal oxide. It is also possible to lower this proportion in cases where a fibrous carbonaceous material such as graphitized carbon fiber or carbon nanotube is used as the electroconductive material.

As the above-described binder, a thermoplastic resin can be employed, and specific examples thereof include fluorine-containing resins such as polyvinylidene fluoride (hereinafter, may be referred to as "PVdF"), polytetrafluoroethylene (hereinafter, may be referred to as "PTFE"), ethylene tetrafluoride/propylene hexafluoride/vinylidene fluoride-based copolymers, propylene hexafluoride/vinylidene fluoride-based copolymers and ethylene tetrafluoride/perfluorovinylether-based copolymers; and polyolefin resins such as polyethylene and polypropylene. Further, two or more of these thermoplastic resins may also be in combination. Moreover, by using a fluorine-containing resin and a polyolefin resin as the binder and allowing an electrode mixture to contain the fluorine-containing resin in an amount of 1 to 10% by weight and the polyolefin resin in an amount of 0.1 to 2% by weight with respect to the amount of the electrode mixture, an electrode mixture having excellent adhesion with the electrode current collector can be obtained.

As the above-described electrode current collector, Al, Ni, stainless steel or the like can be employed, and Al is preferable since it can be easily processed into a thin film and is inexpensive. Examples of the method of allowing the electrode current collector to support the electrode mixture include a method based on press-molding and a method in which a paste of the electrode mixture is prepared with an organic solvent or the like and the thus obtained paste is applied on the electrode current collector, which is then dried and subsequently pressed or the like for fixation. When preparing such paste, a slurry which contains the lithium nickel mixed metal oxide, electroconductive material, binder(s) and an organic solvent is prepared. Examples of the organic solvent include amine-based solvents such as N,N-dimethylaminopropylamine and diethylene triamine; ether-based solvents such as tetrahydrofuran; ketone-based solvents such as methyl ethyl ketone; ester-based solvents such as methyl acetate; and amide-based solvents such as dimethylacetamide and N-methyl-2-pyrrolidone.

Examples of the method of applying the paste of electrode mixture on the electrode current collector include slit-die coating method, screen coating method, curtain coating method, knife coating method, gravure coating method and electrostatic spray method. By using the above-exemplified methods, an electrode can be produced.

<The Nonaqueous Electrolyte Secondary Battery According to the Present Invention>

The above-described electrode according to the present invention is extremely useful as a positive electrode of a nonaqueous electrolyte secondary battery. In this case, in a nonaqueous electrolyte secondary battery comprising a positive electrode, negative electrode and electrolyte, the positive electrode is the electrode according to the present invention. Specifically, such nonaqueous electrolyte secondary battery can be produced in the following manner. After housing an electrode group in a battery case such as a battery can, which electrode group is obtained by laminating or laminating and winding a separator, a negative electrode, a separator and a positive electrode in this order, an electrolyte solution composed of an organic solvent containing an electrolyte is injected into the battery case to produce an nonaqueous electrolyte secondary battery.

Examples of the shape of the above-described electrode group include those which represent a circle, ellipse, rectangle, rectangle with round corners or the like when the electrode group is cut in the direction perpendicular to the winding axis. Further, examples of the shape of the battery include flat, coin, cylinder and angular.

<The Nonaqueous Electrolyte Secondary Battery According to the Present Invention—Negative Electrode>

As the above-described negative electrode, any negative electrode capable of doping and dedoping lithium ions in the nonaqueous electrolyte secondary battery at a lower electric potential than the positive electrode can be employed, and examples thereof include electrodes obtained by allowing a negative electrode current collector to support a negative electrode mixture containing a negative electrode material; and electrodes solely made of a negative electrode material. Examples of the negative electrode material include carbonaceous materials, chalcogen compounds such as oxides and sulfides, nitrides, metals and alloys, which are capable of being doped and dedoped with lithium ions at a lower electric potential than the positive electrode. In addition, two or more of such negative electrode materials may also be used in combination.

The above-described negative electrode materials will now be exemplified below. Specific examples of the above-described carbonaceous material include graphites such as natural graphites and artificial graphites, cokes, carbon black, pyrolytic carbons, carbon fibers, and calcined organic polymer compounds. Specific examples of the above-described oxide include silicon oxides represented by the formula $SiO_x$ (wherein, x is a positive real number), such as $SiO_2$ and $SiO$; titanium oxides represented by the formula $TiO_x$ (wherein, x is a positive real number), such as $TiO_2$ and $TiO$; vanadium oxides represented by the formula $VO_x$ (wherein, x is a positive real number), such as $V_2O_5$ and $VO_2$; iron oxides represented by the formula $FeO_x$ (wherein, x is a positive real number), such as $Fe_3O_4$, $Fe_2O_3$ and $FeO$; tin oxides represented by the formula $SnO_x$ (wherein, x is a positive real number), such as $SnO_2$ and $SnO$; tungsten oxides represented by the formula $WO_x$ (wherein, x is a positive real number), such as $WO_3$ and $WO_2$; and mixed metal oxides containing lithium, titanium and/or vanadium, such as $Li_4Ti_5O_{12}$ and $LiVO_2$ (e.g. $Li_{1.1}V_{0.9}O_2$). Specific examples of the above-described sulfide include titanium sulfides represented by the formula $TiS_x$ (wherein, x is a positive real number), such as $Ti_2S_3$, $TiS_2$ and $TiS$; vanadium sulfides represented by the formula $VS_x$ (wherein, x is a positive real number), such as $V_3S_4$, $VS_2$ and $VS$; iron sulfides represented by the formula $FeS$ (wherein, x is a positive real number), such as $Fe_3S_4$, $FeS_2$ and $FeS$; molybdenum sulfides represented by the formula $MoS_x$ (wherein, x is a positive real number), such as $Mo_2S_3$ and $MoS_2$; tin sulfides represented by the formula $SnS$ (wherein, x is a positive real number), such as $SnS_2$ and $SnS$; tungsten sulfides represented by the formula $WS_x$ (wherein, x is a positive real number), such as $WS_2$; antimony sulfides represented by the formula $SbS_x$ (wherein, x is a positive real number), such as $Sb_2S_3$; and selenium sulfides represented by the formula SeS (wherein, x is a positive real number), such as $Se_5S_3$, $SeS_2$ and SeS. Specific examples of the above-described nitride include lithium-containing nitrides such as $Li_3N$ and $Li_{3-x}A_xN$ (wherein, A is Ni and/or Co; and $0<x<3$). Two or more of these carbonaceous materials, oxides, sulfides and nitrides may be used in combination, and they may be either crystalline or amorphous. Further, these carbonaceous materials, oxides, sulfides and nitrides are primarily supported on a negative electrode current collector to be used as an electrode.

Further, specific examples of the above-described metal include lithium metals, silicon metals and tin metals. Further, examples of the above-described alloy include lithium alloys such as Li—Al, Li—Ni and Li—Si; silicon alloys such as Si—Zn; and tin alloys such as Sn—Mn, Sn—Co, Sn—Ni, Sn—Cu and Sn—La, as well as alloys such as $Cu_2Sb$ and $La_3Ni_2Sn_2$. Primarily, these metals and alloys are solely used as an electrode (for example, in the form of a foil).

From the standpoints of a high electric potential flatness, low average discharge potential and good cycle performance, among the above-described negative electrode materials, those carbonaceous materials containing a graphite such as natural graphite or artificial graphite as the main component are preferably used. The carbonaceous materials may take any form, for example, a flake form as in natural graphites, spherical form as in mesocarbon microbeads, fibrous form as in graphitized carbon fibers, or an aggregate of fine powder.

The above-described negative electrode mixture may also contain a binder as required. Examples of the binder include thermoplastic resins, and specific examples include PVdF, thermoplastic polyimide, carboxymethyl cellulose, polyethylene and polypropylene.

Examples of the above-described negative electrode current collector include Cu, Ni and stainless steel. Since Cu hardly forms an alloy with lithium and is easily processed into a thin film, Cu is preferably used. The method of allowing the negative electrode current collector to support the negative electrode mixture is the same as in the case of the positive electrode, and examples thereof include a method based on press-molding and a method in which a paste of the negative electrode mixture is prepared with an organic solvent or the like and the thus obtained paste is applied on the negative electrode current collector, which is then dried and subsequently press-fixed.

<The Nonaqueous Electrolyte Secondary Battery According to the Present Invention—Separator>

As the above-described separator, for example, a member composed of a material such as polyolefin resin (e.g. polyolefin, polypropylene), fluorine resin or nitrogen-containing aromatic polymer, which member is in the form of a porous membrane, non-woven fabric, woven fabric or the like, can be employed. The separator may be composed of two or more of the above-described materials, or the above-described member may be laminated to form the separator. Examples of the separator also include those described in JP 2000-30686 A, JP 10-324758 A and the like. From the standpoint of attaining an increase in the volume energy density of the battery and a decrease in the internal resistance, it is preferable that the separator be made as thin as possible, as long as the mechanical strength thereof is maintained. The thickness of the separator is usually around from 5 to 200 μm, preferably around from 5 to 40 μm.

It is preferable that the separator comprise a porous film containing a thermoplastic resin. In the nonaqueous electrolyte secondary battery, the separator is arranged between the positive electrode and the negative electrode. In the nonaqueous electrolyte secondary battery, it is preferable that the separator have a function to block electric current to prevent excess current flow (shutdown) in the case of an abnormal current flow in the battery due to, for example, short circuit between the positive and negative electrodes. The shutdown is executed by clogging the micropores of the porous film of the separator when the temperature of the battery surpasses the normal service temperature. It is preferable that, even when the temperature inside the battery increases to a certain high temperature after the shutdown, the separator maintain the shutdown state without being ruptured by the high temperature. Examples of such separator include laminated films which comprise a porous film and heat-resistant porous layer laminated thereon. By using such film as the separator, it is possible to further increase the heat resistance of the secondary battery of the present invention. The heat-resistant porous layer may be laminated on both sides of the porous film.

<The Nonaqueous Electrolyte Secondary Battery According to the Present Invention—Separator—Laminated Film>

The above-described laminated film comprising a porous film and a heat-resistant porous layer laminated thereon will now be described.

In the above-described laminated film, the heat-resistant porous layer is a layer having a higher heat resistance than the porous film. The heat-resistant porous layer may be composed of inorganic powder, or may contain a heat-resistant resin. By allowing the heat-resistant porous layer to contain a heat-resistant resin, the heat-resistant porous layer can be formed by a simple technique such as coating. Examples of the heat-resistant resin include polyamides, polyimides, polyamideimides, polycarbonates, polyacetals, polysulfones, polyphenylene sulfides, polyether ketones, aromatic polyesters, polyether sulfones and polyether imides. From the standpoint of further increasing the heat resistance, polyamides, polyimides, polyamideimides, polyether sulfones and polyether imides are preferable, and polyamides, polyimides and polyamideimides are more preferable. Nitrogen-containing aromatic polymers such as aromatic polyamides (para-oriented aromatic polyamides and meta-oriented aromatic polyamides), aromatic polyimides and aromatic polyamideimides are still more preferable, and aromatic polyamides (aramids) are particularly preferable. From the standpoint of production, para-oriented aromatic polyamides (hereinafter, may be referred to as "para-aramid") are particularly preferable. Examples of the heat-resistant resin also include poly-4-methylpentene-1 and cyclic olefin-based polymers. By using these heat-resistant resins, the heat resistance of the laminated film, that is, the thermal rupture temperature of the laminated film can be further increased. Among these heat-resistant resins, in cases where a nitrogen-containing aromatic polymer is used, the polymer may be sufficiently compatible with the electrolyte solution depending on the molecular polarity, resulting in an improvement in the liquid retaining property of the electrolyte solution in the heat-resistant porous layer. By this, in the production of the nonaqueous electrolyte secondary battery, the injection rate of the electrolyte solution is increased and the charge and discharge capacities of the nonaqueous electrolyte secondary battery are also further improved.

The thermal rupture temperature of the laminated film depends on the type of the heat-resistant resin and is selected in accordance with the use situation and purpose of the use. More specifically, the thermal rupture temperature of the laminated film can be controlled to around 400° C., around 250° C. or around 300° C. when the above-described nitrogen-containing aromatic polymer, poly-4-methylpentene-1 or cyclic olefin-based polymer is used as the heat-resistant resin, respectively. In cases where the heat-resistant porous layer is composed of inorganic powder, it is also possible to control the thermal rupture temperature to, for example, 500° C. or higher.

The above-described para-aramid can be obtained by polycondensation of a para-oriented aromatic diamine and para-oriented aromatic dicarboxylic acid halide. The para-aramid substantially consists of repeating units linked via an amide bond at a para-position or equivalent orientation position (for example, as in 4,4'-biphenylene, 1,5-naphthalene, 2,6-naphthalene and the like, an orientation position extending coaxially or in parallel in the opposite direction). Specific examples of such para-aramid include those having a para-orientated structure or a structure equivalent to para-orientation, such as poly(paraphenylene terephthalamide), poly(parabenzamide), poly(4,4'-benzanilide terephthalamide), poly(paraphenylene-4,4'-biphenylenedicarboxamide), poly(paraphenylene-2,6-naphthalenedicarboxamide), poly(2-chloroparaphenylene terephthalamide) and paraphenylene terephthalamide/2,6-dichloroparaphenylene terephthalamide copolymer.

The above-described aromatic polyimide is preferably a wholly aromatic polyimide produced by polycondensation of an aromatic dianhydride and diamine. Specific examples of the dianhydride include pyromellitic dianhydride, 3,3',4,4'-diphenylsulfone tetracarboxylic dianhydride, 3,3',4,4'-benzophenonetetracarboxylic dianhydride, 2,2'-bis(3,4-dicarboxyphenyl)hexafluoropropane and 3,3',4,4'-biphenyltetracarboxylic dianhydride. Specific examples of the diamine include oxydianiline, paraphenylenediamine, benzophenonediamine, 3,3'-methylenedianiline, 3,3'-diaminobenzophenone, 3,3'-diaminodiphenylsulfone and 1,5'-naphthalenediamine. Further, a solvent-soluble polyimide can be suitably used. Examples of such polyimide include polycondensates of 3,3',4,4'-diphenylsulfone tetracarboxylic dianhydride and an aromatic diamine.

Examples of the above-described aromatic polyamideimide include those obtained by polycondensation of an aromatic dicarboxylic acid and aromatic diisocyanate and those obtained by polycondensation of an aromatic dianhydride and aromatic diisocyanate. Specific examples of the aromatic dicarboxylic acid include isophthalic acid and terephthalic acid. Further, specific examples of the aromatic dianhydride include trimellitic anhydride. Specific examples of the aromatic diisocyanate include 4,4'-diphenylmethanediisocyanate, 2,4-tolylenediisocyanate, 2,6-tolylenediisocyanate, ortho-tolylene diisocyanate and m-xylene diisocyanate.

From the standpoint of further improving the ion permeability, the heat-resistant porous layer is preferably thin. Specifically, the thickness of the heat-resistant porous layer is preferably 1 μm to 10 μm, more preferably 1 μm to 5 μm, particularly preferably 1 μm to 4 μm. Further, the heat-resistant porous layer has micropores and the size (diameter) thereof is usually not larger than 3 μm, preferably not larger than 1 μm. In cases where the heat-resistant porous layer contains a heat-resistant resin, the heat-resistant porous layer may further contain a filler described later.

In the above-described laminated film, it is preferable that the porous film have micropores and shutdown function. In this case, the porous film contains a thermoplastic resin. The size of the micropores of the porous film is usually not larger than 3 μm, preferably not larger than 1 μm. The porosity of the porous film is usually 30 to 80% by volume, preferably 40 to 70% by volume. In the nonaqueous electrolyte secondary battery, in the event where the temperature of the battery surpasses the normal service temperature, the porous film containing a thermoplastic resin is capable of clogging the micropores by softening of the thermoplastic resin constituting the film.

As the above-described thermoplastic resin, any thermoplastic resin which does not dissolve in the electrolyte solution of the nonaqueous electrolyte secondary battery can be selected. Specific examples thereof include polyolefin resins such as polyethylene and polypropylene and thermoplastic polyurethane resins, and a mixture of two or more of these resins may also be used. From the standpoint of allowing the resin to soften at a lower temperature to attain shutdown, it is preferable that the porous film contain polyethylene. Specific examples of the polyethylene include low-density polyethylenes, high-density polyethylenes and linear polyethylenes, as well as those ultrahigh molecular weight polyethylenes having a molecular weight of not less than 1,000,000. From the standpoint of further improving the puncture strength of the porous film, it is preferable that the thermoplastic resin constituting the film contain an ultrahigh molecular weight polyethylene. In the production of the porous film, there are also cases where it is preferable that the thermoplastic resin contain a wax composed of a low molecular weight polyolefin (weight average molecular weight of not higher than 10,000).

The thickness of the porous film in the laminated film is usually 3 to 30 μm, more preferably 3 to 25 μm. In the present invention, the thickness of the laminated film is usually not greater than 40 μm, preferably not greater than 20 μm. When the heat-resistant porous layer has a thickness of A (μm) and the porous film has a thickness of B (μm), it is preferable that the value of A/B be 0.1 to 1.

In cases where the heat-resistant porous layer contains a heat-resistant resin, the heat-resistant porous layer may also contain one or more fillers. The filler can be selected from any of organic powders, inorganic powders and mixtures thereof. It is preferable that the particles constituting the filler have an average particle size of 0.01 μm to 1 μm.

Examples of the above-described organic powder include those powders made of an organic material such as a homopolymer of styrene, vinyl ketone, acrylonitrile, methyl methacrylate, ethyl methacrylate, glycidyl methacrylate or methyl acrylate or a copolymer of two or more of these monomers; fluorine-based resin such as polytetrafluoroethylene, tetrafluoroethylene-hexafluoropropylene copolymer, tetrafluoroethylene-ethylene copolymer or poly(vinylidene fluoride); melamine resin; urea resin; polyolefin; or polymethacrylate. These organic powders may be used individually, or two or more thereof may be used in combination. Among these organic powders, from the standpoint of the chemical stability, polytetrafluoroethylene powder is preferable.

Examples of the above-described inorganic powder include inorganic powders such as metal oxide, metal nitride, metal carbide, metal hydroxide, carbonate or sulfate, and among these powders, a powder made of an inorganic material having low electroconductivity is preferably used. Specific examples of such powder include those made of alumina, silica, titanium dioxide or calcium carbonate. These inorganic powders may be used individually, or two or more thereof may be used in combination. Among these inorganic powders, from the standpoint of the chemical stability, alumina powder is preferable. It is more preferable that all of the particles constituting the filler be alumina particles. It is still more preferable that all of the particles constituting the filler be alumina particles, some or all of which are substantially spherical. In cases where the heat-resistant porous layer is formed from an inorganic powder, the above-exemplified inorganic powders may be used, and as required, a binder may be mixed therewith.

In cases where the heat-resistant porous layer contains a heat-resistant resin, the content of the filler depends on the specific gravity of the filler material. For example, when all of the particles constituting the filler are alumina particles, the weight of the filler is usually 5 to 95, preferably 20 to 95, more preferably 30 to 90, taking the total weight of the heat-resistant porous layer as 100. These ranges can be appropriately selected depending on the specific gravity of the filler material.

Examples of the shape of the particles constituting the filler include those of a substantial sphere, plate, column, needle, whisker and fiber, and particles having any of these shapes can be used; however, substantially spherical particles are preferable since uniform pores are easily formed. Examples of such substantially spherical particle include those particles having a particle aspect ratio (major axis of particle/minor axis of particle) in the range of 1 to 1.5. The particle aspect ratio can be measured by an electron micrograph.

In the secondary battery, from the standpoint of the ion permeability, the air permeability of the separator which is determined by Gurley method is preferably 50 to 300 sec/100 cc, more preferably 50 to 200 sec/100 cc. Further, the porosity of the separator is usually 30 to 80% by volume, preferably 40 to 70% by volume. The separator may be a laminate of separators having different porosities.

<The Nonaqueous Electrolyte Secondary Battery According to the Present Invention—Electrolyte Solution>

In the secondary battery, the electrolyte solution is usually composed of an organic solvent containing an electrolyte. Examples of the electrolyte include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (wherein, BOB means bis(oxalato)borate), lithium salt of lower aliphatic carboxylic acid and $LiAlCl_4$. A mixture of two or more of these may also be used. Usually, among these lithium salts, one or more fluorine-containing lithium salts selected from the group consisting of $LiPF_6$, $LiAsF_6$, $LiSbF_6$, $LiBF_4$, $LiCF_3SO_3$, $LiN(SO_2CF_3)_2$ and $LiC(SO_2CF_3)_3$ are used.

As the organic solvent in the above-described electrolyte solution, for example, carbonates such as propylene carbonate, ethylene carbonate, dimethyl carbonate, diethyl carbonate, ethyl methyl carbonate, 4-trifluoromethyl-1,3-dioxolan-2-one, and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran and 2-methyltetrahydrofuran; esters such as methyl formate, methyl acetate and γ-butyrolactone; nitriles such as acetonitrile and butyronitrile; amides such as N,N-dimethylformamide and N,N-dimethylacetamide; carbamates such as 3-methyl-2-oxazolidone; and sulfur-containing compounds such as sulfolane, dimethylsulfoxide, and 1,3-propanesultone, or those in which a fluorine substituent is further introduced to the above-described organic solvents, can be used. Usually, a mixed solvent of two or more of these organic solvents is employed. Thereamong, a mixed solvent containing a carbonate is preferable. A mixed solvent of a cyclic carbonate and non-cyclic carbonate and a mixed solvent of a cyclic carbonate and ether are more preferable. As the mixed solvent of a cyclic carbonate and non-cyclic carbonate, for example, from the standpoints of a broader operating temperature range and superior load characteristics and since a negative electrode material composed of a graphite material such as natural graphite or artificial graphite is hardly decomposed, a mixed solvent containing ethylene carbonate, dimethyl carbonate and ethyl methyl carbonate is preferable. From the standpoint of attaining an exceptional safety-improving effect, it is preferable to use an electrolyte solution which contains a fluorine-containing lithium salt such as $LiPF_6$ and a fluorine substituent-containing organic solvent. Since a mixed solvent which contains a fluorine substituent-containing ether such as pentafluoropropyl methyl ether or 2,2,3,3-tetrafluoropropyl difluoromethyl ether and dimethyl carbonate also has superior large-current discharge property, such mixed solvent is more preferable.

<The Nonaqueous Electrolyte Secondary Battery According to the Present Invention—Solid Electrolyte>

In place of the above-described electrolyte solution, a solid electrolyte may be used. As the solid electrolyte, for example, organic polymer electrolytes such as polyethylene oxide-based polymers and polymers containing at least one of polyorganosiloxane chain and polyoxyalkylene chain can be used. Gel-type electrolytes in which a polymer supports electrolyte solution can also be used. Further, inorganic solid electrolytes which contain a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$ or $Li_2S$—$SiS_2$—$Li_2SO_4$ can also be used. By using these solid electrolytes, the safety of the battery may be further improved. In the nonaqueous electrolyte secondary battery of the present invention, in cases where a solid electrolyte is used, since it may serve as a separator, there are cases where a separator is not required.

EXAMPLES

The present invention will now be described in more detail by way of examples thereof.

(1) Plasma Emission Spectrometry of Particles by a Particle Analyzer

Using a particle analyzer (manufactured by Horiba Ltd.: DP-1000 model), powder was subjected to plasma emission spectrometry of particles in accordance with the following method. Using a sampling apparatus (low-volume sampler, LS-1000; manufactured by Horiba Ltd.), after placing the powder on a membrane filter, a particle constituting the powder placed on the filter was aspirated using an aspirator and the particle was fed into the plasma inside the particle analyzer. Not less than 1,000 particles were measured. For nickel, the detector channel of the apparatus was set to 2 and the emission spectrum at an emission wavelength of 341.480 nm was measured with a high-voltage power amplification of 1.00. For lithium, the detector channel of the apparatus was set to 4 and the emission spectrum at an emission wavelength of 670.780 nm was measured with a high-voltage power amplification of 0.90. Using the particle analyzer, the emission intensity of lithium and emission intensity of nickel of each particle constituting the powder were plotted to obtain a synchronous distribution chart, and the absolute deviation thereof was determined with respect to an approximate straight-line obtained from the synchronous distribution chart. In addition, the release rate of lithium was determined from this synchronous distribution chart.

(2) Measurement of Bulk Density

The bulk density was measured in accordance with the method prescribed in JIS R 1628.

(3) Measurement of BET Specific Surface Area

Using a BET specific surface area measuring apparatus (Flow Sorb II 2300, Micromeritics Instrument Corporation), the BET specific surface area was measured by the BET one-point method.

(4) Preparation of Nonaqueous Electrolyte Secondary Battery and Charge-Discharge Test Thereof To a mixture of a lithium nickel mixed metal oxide and electroconductive material (prepared by mixing acetylene black and graphite at a weight ratio of 1:9), N-methyl-2-pyrrolidone (NMP) solution of a binder (PVdF) was added, and the resultant was kneaded to obtain a paste of electrode mixture. The weight ratio of the oxide, electroconductive material and binder was 86:10:4. The thus obtained paste was applied to a 40 μm-thick Al foil serving as a current collector, and the resultant was dried under vacuum at 150° C. for 8 hours to obtain an electrode.

The thus obtained electrode was used as a positive electrode. As an electrolyte solution, a solution obtained by dissolving $LiPF_6$ in a 30:35:35 (volume ratio) mixed solution of ethylene carbonate, dimethyl carbonate and ethyl methyl carbonate to a concentration of 1 mol/L was used. As a separator, a polypropylene porous film was used. As a negative electrode, lithium metal was used. These members were combined to prepare a nonaqueous electrolyte secondary battery (coin-type battery, R2032).

Using the thus obtained coin-type battery, a charge-discharge test was carried out under the following conditions while maintaining the battery at 25° C. In the charge-discharge test, the charge and discharge capacities of each cycle were measured. In addition, using the formula below, the initial charge/discharge efficiency was calculated.
<Charge-Discharge Test>
1st cycle
    Maximum charging voltage: 4.2 V
    Charging current: 0.2 mA/cm$^2$
    Charging time: 12 hours
    Minimum discharging voltage: 3.0 V
    Discharging current: 0.2 mA/cm$^2$
2nd to 20th cycle
    Maximum charging voltage: 4.2 V
    Charging current: 1.0 mA/cm$^2$
    Charging time: 3 hours
    Minimum discharging voltage: 3.0 V
    Discharging current: 1.0 mA/cm$^2$
<Initial Charge/Discharge Efficiency>
Initial charge/discharge efficiency (%)=Discharge capacity of the 1st cycle/Charge capacity of the 1st cycle×100

Example 1

Powder Production

Lithium hydroxide ($LiOH \cdot H_2O$: manufactured by The Honjo Chemical Corporation, pulverized average particle size of 10 to 25 μm) and nickel-containing mixed metal hydroxide ($Ni_{0.85}Co_{0.15}(OH)_2$: average particle size of 10 μm) were weighed such that the molar ratio of Li:Ni:Co became 1.03:0.85:0.15. Using a Loedige mixer (manufactured by MATSUBO Corporation, FM-130D model), these materials were mixed by stirring for 5 minutes at a main shaft speed (stirring blade) of 160 rpm and then for another 30 minutes at a chopper speed of 3,000 rpm while maintaining the main shaft speed of 160 rpm, thereby obtaining powder 1. When the thus obtained powder 1 was evaluated by plasma emission spectrometry of particles using the particle analyzer, the absolute deviation prescribed in the requirement (1) was 0.05 and the release rate of lithium prescribed in the requirement (2) was 40.

Production of Lithium Nickel Mixed Metal Oxide

The powder 1 was loaded into an alumina sheath and calcined under oxygen atmosphere at 750° C. for 10 hours to obtain an aggregate. This aggregate was pulverized by a dry ball mill using a 15 mmφ nylon-coated steel ball as pulverizing medium to obtain lithium nickel mixed metal oxide powder. The thus obtained powder and aluminum oxide (manufactured by Nippon Aerosil Co., Ltd., trade name "Alumina C"; primary particle size of 13 nm, BET specific surface area of 113 m$^2$/g) were weighed such that the weight ratio thereof became 1:0.03. These materials were mixed using the above-described Loedige mixer (manufactured by MATSUBO Corporation, FM-130D model). The thus obtained mixture was heat-treated under oxygen atmosphere at 750° C. for 1.2 hours. By classifying the resulting heat-treated product using an air classifier (Turboprex, manufactured by Hosokawa Micron Corporation, ATP-50), the fine particle side of the heat-treated product was reduced to obtain a granular lithium nickel mixed metal oxide 1.

The thus obtained lithium nickel mixed metal oxide 1 had a bulk density of 2.59 g/cm$^3$ and a BET specific surface area of 0.35 m$^2$/g.

Charge-Discharge Test

A nonaqueous electrolyte secondary battery was prepared using the lithium nickel mixed metal oxide 1. When the capacities of the secondary battery were measured by a charge-discharge test, both of the charge and discharge capacities of the first cycle were high at 218 mAh/g and 186 mAh/g, respectively. The initial charge/discharge efficiency was high at 85.5%. In addition, the discharge capacity of the 10th cycle was 171 mAh/g and that of the 20th cycle was 166 mAh/g.

Comparative Example 1

Powder Production

After drying the powder 1 at 120° C. for 10 hours, the thus dried powder was pulverized and mixed using a Dynamic Mill which utilizes a pulverizing medium (manufactured by Mitsui Mining Co., Ltd., MYD-5XA model) under the following conditions to obtain powder 2.
    Pulverizing medium: 5 mmφ high alumina (6.1 kg)
    Agitator shaft speed: 500 rpm
    Powder supply: 7 kg/h When the thus obtained powder 2 was evaluated by plasma emission spectrometry of particles using the particle analyzer, the absolute deviation prescribed in the requirement (1) was 0.13 and the release rate of lithium prescribed in the requirement (2) was 91.

Production of Lithium Nickel Mixed Metal Oxide

Lithium nickel mixed metal oxide 2 was obtained in the same manner as in Example 1 except that the powder 2 was used in place of the powder 1.

The thus obtained lithium nickel mixed metal oxide 2 had a bulk density of 2.58 g/cm$^3$ and a BET specific surface area of 0.46 m$^2$/g.

Charge-Discharge Test

A nonaqueous electrolyte secondary battery was prepared using the lithium nickel mixed metal oxide 2. When the capacities of the secondary battery were measured by a charge-discharge test, the charge capacity of the first cycle was 219 mAh/g and the discharge capacity of the first cycle was low at 168 mAh/g. The initial charge/discharge efficiency was high at 76.3%. In addition, the discharge capacity of the 10th cycle was 155 mAh/g and that of the 20th cycle was 156 mAh/g.

Production Example

Production of Laminated Film (1) Production of Coating Slurry

After dissolving 272.7 g of calcium chloride in 4,200 g of NMP, 132.9 g of paraphenylene diamine was added thereto and dissolved completely. To the thus obtained solution, 243.3 g of terephthalic acid dichloride was slowly added and polymerized to obtain a para-aramid, which was then diluted with NMP to obtain a para-aramid solution (A) having a concentration of 2.0% by weight. To 100 g of the thus obtained para-aramid solution, 2 g of alumina powder (a) (manufactured by Nippon Aerosil Co., Ltd., Alumina C, average particle size of 0.02 μm) and 2 g of alumina powder (b) (Sumicorandom manufactured by Sumitomo Chemical Co., Ltd., AA03, average particle size of 0.3 μm) were added as fillers in a total amount of 4 g. The resultant was mixed and treated with a nanomizer three times, and then filtered through a 1000-mesh wire cloth and subjected to defoaming under reduced pressure to produce a coating slurry (B). The weight of the alumina powders (fillers) was 67% by weight with respect to the total weight of the para-aramid and alumina powders.

(2) Production and Evaluation of Laminated Film

As a porous film, a polyethylene porous film (film thickness of 12 μm, air permeability of 140 sec/100 cc, average pore size of 0.1 μm, porosity of 50%) was employed. The above-described polyethylene porous film was fixed onto a 100 μm-thick PET film and the coating slurry (B) was applied on the porous film using a bar coater manufactured by Tester Sangyo Co., Ltd. The PET film and the thus coated porous film were, while being kept together, immersed in water, which is a poor solvent, to precipitate a para-aramid porous membrane (heat-resistant porous layer). Then, the solvent was dried to obtain a laminated film 1 in which the heat-resistant porous layer and porous film were laminated. The laminated film 1 had a thickness of 16 μm and the para-aramid porous membrane (heat-resistant porous layer) had a thickness of 4 μm. The laminated film 1 had an air permeability of 180 sec/100 cc and a porosity of 50%. When the cross-section of the heat-resistant porous layer of the laminated film 1 was observed under a scanning electron microscope (SEM), it was found that the heat-resistant porous layer had relatively small micropores of around from 0.03 μm to 0.06 μm in size and relatively large micropores of around from 0.1 μm to 1 μm in size. The evaluation of the laminated film was performed in accordance with the following method.

<Evaluation of the Laminated Film>

(A) Measurement of Thickness

The thickness of the laminated film and porous film was measured in accordance with JIS standard (K7130-1992). Further, as the thickness of the heat-resistant porous layer, a value obtained by subtracting the thickness of the porous film from that of the laminated film was used.

(B) Measurement of Air Permeability by Gurley Method

The air permeability of the laminated film was measured in accordance with JIS P8117 using a digital time-type Gurley densometer manufactured by Yasuda Seiki Seisakusho Ltd.

(C) Porosity

A sample of the thus obtained laminated film was cut into a square of 10 cm×10 cm, and the weight W (g) and the thickness D (cm) thereof were measured. The weight of each layer in the sample (Wi (g)) was measured and the volume of each layer was determined based on the $W_i$ and the true specific gravity ($\rho_i$ (g/cm$^3$)) to calculate the porosity (% by volume) using the following formula:

Porosity (% by volume)=$100 \times \{1-(W_1/\rho_1+W_2/\rho_2+\ldots+W_n/\rho_n)/(10 \times 10 \times D)\}$ In the above-described battery of Example 1, by using the same laminated film as in Production Example as the separator, a nonaqueous electrolyte secondary battery capable of further preventing thermal film rupture can be obtained.

INDUSTRIAL APPLICABILITY

According to the present invention, a nonaqueous electrolyte secondary battery exhibiting high discharge capacity can be provided; therefore, the present invention is extremely industrially useful.

The invention claimed is:

1. A powder comprising a lithium-containing compound and a nickel-containing mixed metal hydroxide and satisfying the following requirements of (1) and (2) when the powder is analyzed by plasma emission spectrometry of particles:
   (1) an absolute deviation of a synchronous distribution chart against an approximated straight-line is 0.10 or less, wherein the approximated straight-line is evaluated from a synchronous distribution chart obtained by plotting an emission intensity of lithium and an emission intensity of nickel of each particle composing of the powder, and
   (2) a release rate of lithium evaluated by the following formula is 80 or less:

Release rate of lithium=$(n_b/n_a) \times 100$ wherein, $n_a$ is the number of particles containing lithium in the powder, and $n_b$ is the number of particles containing lithium and not containing nickel in the powder.

2. The powder according to claim 1, wherein the nickel-containing mixed metal hydroxide further contains, in addition to nickel, at least one transition metal element selected from the group consisting of cobalt, manganese and iron, and the molar ratio of nickel with respect to all transition metal elements in the nickel-containing mixed metal hydroxide is 0.3 or more and 0.9 or less.

3. The powder according to claim 2, wherein the molar ratio of lithium with respect to all transition metal elements in the nickel-containing mixed metal hydroxide is 0.9 or more and 1.3 or less.

4. The powder according to claim 1, wherein the lithium-containing compound is lithium hydroxide.

5. A lithium nickel mixed metal oxide obtained by calcining the powder according to claim 1 at a temperature in the range of 650° C. or more and 1050° C. or less.

6. The lithium nickel mixed metal oxide according to claim 5, which has a bulk density of from 2.0 to 3.5 g/cm$^3$.

7. An electrode comprising the lithium nickel mixed metal oxide according to claim 5.

8. A nonaqueous electrolyte secondary battery comprising a positive electrode, a negative electrode, and an electrolyte, wherein the positive electrode is the electrode according to claim 7.

9. The nonaqueous electrolyte secondary battery according to claim 8, further comprising a separator.

10. The nonaqueous electrolyte secondary battery according to claim 9, wherein the separator is composed of a laminated film which has a porous film and a heat resistant porous layer laminated thereon.

* * * * *